United States Patent
Lener et al.

(10) Patent No.: US 10,608,246 B2
(45) Date of Patent: Mar. 31, 2020

(54) SBA-15/C ANODE FOR A LITHIUM-ION BATTERY AND MANUFACTURING METHOD THEREOF

(71) Applicants: YPF TECNOLOGÍA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR); UNIVERSIDAD NACIONAL DE CÓRDOBA, Ciudad Universitaria (AR)

(72) Inventors: German Lener, Ciudad de Córdoba (AR); Ezequiel Leiva, Cuidad de Córdoba (AR); Daniel Barraco Díaz, Villa Allende (AR); Manuel Otero, Río Cuarto (AR)

(73) Assignees: YPF TECHNOLOGIA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR); UNIVERSIDAD NACIONAL DE CÓRDOBA, Ciudad Universitaria (AR)

( * ) Notice: Subject to any disclaimer, the term of this patent is extended or adjusted under 35 U.S.C. 154(b) by 149 days.

(21) Appl. No.: 15/827,276

(22) Filed: Nov. 30, 2017

(65) Prior Publication Data

US 2019/0165369 A1    May 30, 2019

(51) Int. Cl.
*H01M 4/36* (2006.01)
*H01M 4/48* (2010.01)
(Continued)

(52) U.S. Cl.
CPC .......... *H01M 4/364* (2013.01); *H01M 4/131* (2013.01); *H01M 4/1391* (2013.01);
(Continued)

(58) Field of Classification Search
None
See application file for complete search history.

(56) References Cited

U.S. PATENT DOCUMENTS 9,991,509 B2 * 6/2018 Yoo ................... H01M 4/366
2009/0029256 A1 * 1/2009 Mah ................... H01B 1/24
429/231.8
(Continued)

FOREIGN PATENT DOCUMENTS

| CN | 104528740 A | 4/2015 |
| CN | 104701496 A | 6/2015 |
| CN | 106159222 A | 11/2016 |

OTHER PUBLICATIONS https://en.wikipedia.org/wiki/Microporous_material. Wikipedia printout for "microporous material". No date.*

*Primary Examiner* — Tracy M Dove
(74) *Attorney, Agent, or Firm* — Muncy, Geissler, Olds & Lowe, P.C.

(57) ABSTRACT

The present invention is directed to an anode for a lithium-ion battery and a method of manufacturing the same. The anode is manufactured from a material composed of Si and C known as SBA-15/C having a porous structure of mesopores interconnected by micropores, wherein carbon nanofibers occupy the pore space of the porous structure. The anode has improved conductivity properties and allows to mitigate the drawbacks linked to the volumetric expansion of the anode during the operation of a lithium-ion battery.

8 Claims, 10 Drawing Sheets

(51) Int. Cl.
*H01M 10/0525* (2010.01)
*H01M 4/587* (2010.01)
*H01M 4/131* (2010.01)
*H01M 4/62* (2006.01)
*H01M 4/1391* (2010.01)
*H01M 4/02* (2006.01)

(52) U.S. Cl.
CPC ........... *H01M 4/483* (2013.01); *H01M 4/587* (2013.01); *H01M 4/625* (2013.01); *H01M 10/0525* (2013.01); *H01M 2004/027* (2013.01)

(56) References Cited

U.S. PATENT DOCUMENTS

| | | | |
|---|---|---|---|
| 2010/0136431 A1* | 6/2010 | Lee | H01M 4/13 429/231.8 |
| 2011/0051322 A1* | 3/2011 | Pushparaj | C23C 16/24 361/525 |
| 2012/0258371 A1* | 10/2012 | Nakanishi | C23C 16/26 429/231.8 |
| 2014/0021415 A1* | 1/2014 | Kang | H01M 4/0438 252/502 |
| 2014/0065464 A1* | 3/2014 | Masarapu | H01M 4/134 429/149 |
| 2014/0154578 A1* | 6/2014 | Yoo | H01M 4/366 429/231.8 |
| 2014/0178754 A1* | 6/2014 | Kim | H01M 4/366 429/211 |
| 2017/0260057 A1 | 9/2017 | LeBlanc et al. | |

\* cited by examiner

SBA-15/C ANODE FOR A LITHIUM-ION BATTERY AND MANUFACTURING METHOD THEREOF

FIELD OF THE INVENTION

The present invention relates to the technical area of electrochemical devices for obtaining and storing electrical energy. In particular, the present invention relates to an SBA-15/C anode for a lithium-ion battery and to a method of manufacturing said anode.

BACKGROUND OF THE INVENTION

Lithium-ion batteries (LIB) are widely used in electronic devices, electric vehicles, and for the storage of renewable energies such as photovoltaic and wind energies, among others. LIBs allow the storage of this energy for later use, being it possible to adapt them to different energy demand conditions.

The current research work on LIBs is focused on obtaining high capacity anodes based on silicon (Si), since the theoretical capacity of said anodes is 3579 $mAhg^{-1}$, being significantly higher than that of graphite, which is more commonly used: 372 $mAhg^{-1}$. However, it is known that Si undergoes a significant process of volumetric expansion that causes a progressive pulverization and disconnection of electrical contact. This results in a loss of anode capacity during the first cycles of a LIB operation.

The Si-metal-based anodes in a LIB undergo a volumetric expansion of approximately 300%, due to the formation of an alloy of general formula $Li_xSi_y$. On the other hand, graphite undergoes a smaller expansion, of approximately 7%, as a consequence of an intercalation mechanism of Li ions in the graphite layers. In the first case, the negative effect of this expansion has been partially solved using Si nanoparticles encapsulated in conductive carbon, or by reduction of pre-synthesized $SiO_2$ composites by magnesiothermal reduction.

Patent application US 2017/260057 describes a process for the manufacture of nanoparticles of formula $SiO_x$, where x is comprised between 0.8 and 1.2, by means of a fusion reaction between $SiO_2$ and Si, at a temperature of at least 1410° C.

The disadvantage of such strategies is the high cost of the process, since the reduction of $SiO_2$ to Si has a high activation energy, and is therefore expensive. Additionally, the volumetric expansion of the Si particles thus formed represents a drawback on an industrial scale.

Additionally, the charge/discharge capacity should be improved by an adequate ionic conductivity during the electrochemical process of Li ion migration. To this end, the ionic and electrical conductivities of the electrode materials must be improved. In this way, the high specific capacity could be maintained, even at high current densities.

Patent applications CN 106159222 and CN104701496 describe anodes for a LIB comprising a carbonaceous structure of high electrical conductivity, as well as Co and Sn nanoparticles. Although these anodes are manufactured from a material based on $SiO_2$, said material is subsequently removed from the anodes. Application CN 104528740 is directed to a composite material comprising $SiO_2$ and carbon, with a carbon content of less than 20%. None of these documents teaches or suggests the anodes and manufacturing methods of the present invention.

$SiO_2$-based materials are attractive alternatives for the manufacture of Si-based anodes, since silica is one of the most abundant elements in Earth's crust and since $SiO_2$ clays with complex porous nanostructures are well known. The synthesis of nanoporous materials from $SiO_2$ is generally simple and inexpensive. In addition, these compounds could be used as a model material for complex natural clays, which could be used to store energy at a reduced cost. However, the main drawback of silica is the insulation characteristics thereof. Electron conduction is not possible with pure $SiO_2$, thus limiting possible reduction to Si and other silicon products. The formation of said other products, in particular of $Li_xSi_y$ compounds, is decisive, since they provide ionic conductivity and allow limiting the volumetric expansion during the charging and discharging processes of a LIB.

There is therefore a need to provide an anode for a LIB that has improved electrical conductivity and volumetric expansion characteristics, and the manufacturing process of which is economically advantageous, compared to the existing alternatives of the prior art.

SUMMARY OF THE INVENTION

The present invention aims to solve the drawbacks of the prior art, by providing an anode for a LIB based on a composite material made from highly ordered $SiO_2$, and including a conductive carbon structure, so as to improve ionic and electrical conductivities, thus avoiding long, complex and costly syntheses employed in similar inventions of the prior art.

For this purpose, various mesoporous materials made from $SiO_2$ can be used. By filling the pores of these materials with conductive carbon, conductivities are improved, since a conductive skeleton is generated that improves the conversion of $SiO_2$ to Si and other products. Said other products are, in turn, advantageous during the operation of a LIB, since they mitigate the effect of the volumetric expansion during the lithiation process and improve the ionic diffusion of $Li^+$.

Accordingly, in one aspect of the present invention, it is an object thereof a composite material for lithium-ion battery anodes comprising a composite material comprising carbon nanofibers and $SiO_2$. The composite material has a high carbon content, resulting in improved electrical conduction properties.

In another aspect of the present invention, it is an object thereof an anode for a lithium-ion battery, comprising a composite material comprising carbon nanofibers and $SiO_2$. The composite material has a high carbon content, resulting in improved electrical conduction properties thereof.

In still another aspect, it is an object of the present invention a lithium-ion battery comprising an anode that comprises a composite material comprising carbon nanofibers and $SiO_2$.

In an embodiment of said aspects of the present invention mentioned above, said composite material has a porous structure comprising mesopores interconnected by micropores, wherein said carbon nanofibers occupy the pore space of said porous structure.

In another preferred embodiment of said above-mentioned aspects of the present invention, the carbon content in said composite material is about 45% by weight.

In a preferred embodiment of said above-mentioned aspects of the present invention, said mesopores have a mean diameter of about 5 nm and said micropores have a mean diameter of about 1 nm.

In a preferred embodiment of said aspects of the invention mentioned above, a chemical reduction reaction of $SiO_2$ to Si occurs at said anode.

In still another aspect of the present invention, it is an object thereof a method of manufacturing an anode for a lithium-ion battery according to the first aspect of the present invention, wherein the method comprises the steps of:

a) providing a porous material from a $SiO_2$ source,
b) impregnating said porous material with a solution comprising a carbon source and an acid, and
c) drying the porous material obtained in b).

In one embodiment of said aspect of the present invention, said carbon source is sucrose.

In one embodiment of said aspect of the present invention, said acid is sulfuric acid.

In an embodiment of said aspect of the present invention, the drying stage c) is carried out at 900° C. under an argon atmosphere.

In still another aspect of the present invention, it is an object thereof an anode for a lithium battery obtained by the method of the invention.

DETAILED DESCRIPTION OF THE INVENTION

The present invention will be described in detail below, with reference to the figures and examples, which are included only for the purpose of illustrating the invention and are not to be construed as limiting thereof.

The term "approximately" as used herein when referring to a measurable value means that it comprises variations of ±10% from the specified amount.

As used herein, the terms "comprises", "has" and "includes" and their conjugations, mean "including but not limited to".

The anode for a lithium-ion battery of the present invention can be obtained from a starting porous material comprising $SiO_2$, treated with a carbon source in order to obtain a composite material.

In an embodiment of the invention, the starting porous material is a material made from $SiO_2$ known as SBA-15. Said compound has a porous structure of mesopores interconnected by micropores.

In order to obtain the composite material of the present invention, SBA-15 is impregnated with a solution of sucrose (carbon source) and sulfuric acid. Next, the material so obtained is dried and heat treated under an argon atmosphere at 900° C. for 5 h, thus obtaining a mixed three-dimensional material comprising a carbonaceous structure formed by carbon nanofibers, said structure being surrounded by $SiO_2$.

The composite material thus formed is designated as SBA-15/C. The advantage of using this composite material as an anode in lithium-ion batteries lies in a surprising synergistic effect between $SiO_2$ and the carbonaceous structure.

Pure $SiO_2$ has a high theoretical specific capacity of 950 $mAhg^{-1}$, related to the reduction of $SiO_2$ to Si by reaction with Li during the charging of a lithium-ion battery. However, as it is an insulating material, it does not conduct electricity and has a capacitive response. Incorporation of a carbonaceous structure in the $SiO_2$ material treated at high temperature, according to an embodiment of the present invention, generates an electronic and ionic conductive interface. For this reason, and from the thermodynamic point of view, during an electrochemical process $SiO_2$ can incorporate electrical charge in the form of $Li^+$ ions and electrons, to be reduced to Si, according to the partial reactions (1) to (4):

$$4/5Li^+ + 4/5e^- + SiO_2 \leftrightarrow 2/5Li_2Si_2O_5 + 1/5Si \text{ Theoretical capacity: 663 mAh g}^{-1} \quad (1)$$

$$4/3Li^+ + 4/3e^- + SiO_2 \rightarrow 2/3Li_2SiO_3 + 1/3Si \text{ Theoretical capacity: 483 mAh g}^{-1} \quad (2)$$

$$2Li^+ + 2e^- + SiO_2 \rightarrow 1/2Li_4SiO_4 + 1/2Si \text{ Theoretical capacity: 679 mAh g}^{-1} \quad (3)$$

$$4Li^+ + 4e^- + SiO_2 \rightarrow 2Li_2O + Si \text{ Theoretical capacity: 1142 mAh g}^{-1} \quad (4)$$

Once Si is formed according to the above partial reactions, Li storage can be produced according to the following partial reaction:

$$4Si + 15Li^+ + 15e^- \rightarrow Li_{15}Si_4 \quad (4) \text{ Theoretical capacity} = 3579 \text{ mAhg}^{-1}$$

The composite material SBA-15/C has a specific capacity of 450 $mAhg^{-1}$, superior to that of graphite commercially used in similar applications. Surprisingly, it is observed that it is possible to discharge the anode manufactured from the composite material at high current rates, without meaningfully changing its specific capacity.

It should be noted that Argentina has soil rich in silicon oxide, as well as sucrose from sugar cane. For this reason, the composite material for the anode of the present invention can be obtained economically in the Argentine territory.

Example

Experimental Method:
1) Synthesis of Materials

The SBA-15 material was synthesized according to the method reported by Zhao et al. (see e.g. Cano, L. A.; Garcia Blanco, A. A.; Lener, G.; Marchetti, S. G.; Sapag, K. *Catal. Today* 2016, Zhao, D.; Huo, Q.; Feng, J.; Chmelka, B. F.; Stucky, G. D. *J. Am. Chem. Soc.* 1998, 120, 6024-6036; Zhao, D. *Science* (80-.). (1998), 279, 548-552)

Pluronic triblock copolymer P123 (EO20-PO70-EO20) was used as a structuring organic compound. 12 g of P123 were dissolved in 360 ml of ultra-pure water and 60 ml of 37% w/w HCl solution. The mixture was stirred for 3 h at 40° C. until a clear solution was obtained. To this solution, 27 ml of tetraethylorthosilicate (TEOS) was added dropwise as a silica source. Once the TEOS was added, the mixture was allowed at 40° C. under stirring for 24 h. The mixture was then allowed to age 24 h without stirring at 40° C. The solid was filtered and washed at room temperature with ultra-pure water. Then, the solid was dried at 80° C. and calcined at 500° C. for 6 h, using a heating ramp rate of 1° C./min starting from room temperature.

The synthesis of the composite material SBA-15/C was carried out by impregnation with a sucrose solution in sulfuric acid medium. A ratio of 2:1 sucrose/SBA-15 and 5 ml of ultra-pure water per gram of sucrose was used. The mixture SBA-15/sucrose was stirred for 2 h, then 0.14 ml of $H_2SO_4$ (98% w/w) was added per ml of water and it was left under stirring for 1 h. The mixture was dried in air at 80° C. for 6 h. Subsequently, a thermal treatment was carried out in a $N_2$ inert atmosphere from room temperature up to 700° C. for 5 h with a heating ramp rate of 2° C./min. The resulting sample was divided into two parts. One part was subjected to another thermal treatment at 900° C. in a $N_2$ inert atmosphere to obtain the composite material SBA-15/C. The other part was treated with NaOH at 60° C. for 5 h in order to dissolve the $SiO_2$ matrix. This carbonaceous structure was subjected to thermal treatment in $N_2$ at 900° C. for 5 h to obtain a material known as CMK-3 (see Shin, H J, Ryoo, R.; Kruk, M.; Jaroniec, M. *Chem. Commun.* 1, (2001), 349-350. The final temperature control is of utmost importance in order to desorb functional groups and obtain a material with optimal electrical conduction.

2) Characterization

The adsorption/desorption isotherms were obtained with $N_2$ at 77K using a Quantachrome Autosorb 1-MP equipment. Before making the measurements, samples were degassed in vacuum at 250° C. for 12 h. The textural properties, such as specific surface area ($S_g$), micropore volume ($V_{\mu p}$), total pore volume (TPV) and pore size distribution ($W_P$) were calculated from the experimental data; $S_g$ and $V_{\mu p}$ were obtained by the BET method and the $\alpha_s$-plot method respectively. $W_p$ was calculated using the VBS method (see Villarroel-Rocha, J.; Barrera, D.; Sapag, K. *Microporous Mesoporous Mater.* 200(2014), 68-78). Thermogravimetric analysis was performed in air from room temperature to 1300° C. to determine the $SiO_2/C$ ratio in the composite material.

3) Electrochemical Measurements

The study of the electrochemical performance of the anodes was carried out with a Swagelok type T cell, using a metallic lithium disk of 8 mm in diameter as counterelectrode. The working electrode was prepared with the tested material, PVDF as binder and super P carbon as conductive material, in a 80:10:10 ratio. The mixture of the tested material was deposited on a copper foil as a current collector and dried at 80° C. for 12 h.

Results:

1) Characterization

Figure 1:
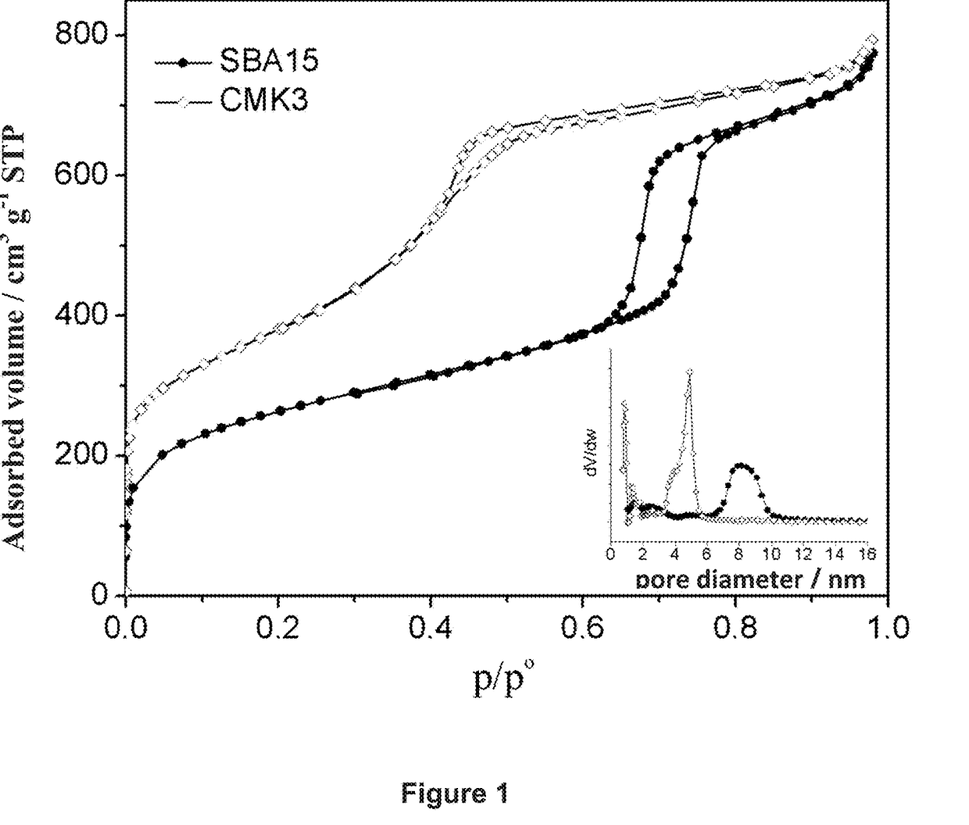
FIG. 1 shows the nitrogen adsorption/desorption isotherms of synthesized materials and the hysteresis curves corresponding to the different porous structures of the materials obtained according to an exemplary embodiment of the present invention.

FIG. 1 shows the isotherms of nitrogen adsorption/desorption at 77 K of the synthesized materials. There, the hysteresis curves corresponding to the mesoporous structure can be observed. The slope at low relative pressures correspond to the microporous structure, characteristic of SBA-15 and CMK-3 materials.

The mean diameter of mesopores was 8 nm and 5 nm for SBA-15 and CMK-3 respectively, while the mean diameter of micropores was approximately 1 nm for both materials.

As mentioned above, CMK-3 is obtained by filling pores of SBA-15 with a carbonaceous structure. Therefore, CMK-3 represents the inverse replica of SBA-15. Therefore, having successfully obtained CMK-3 indicates that SBA-15/C material has pores filled with carbonaceous material.

Figure 2:
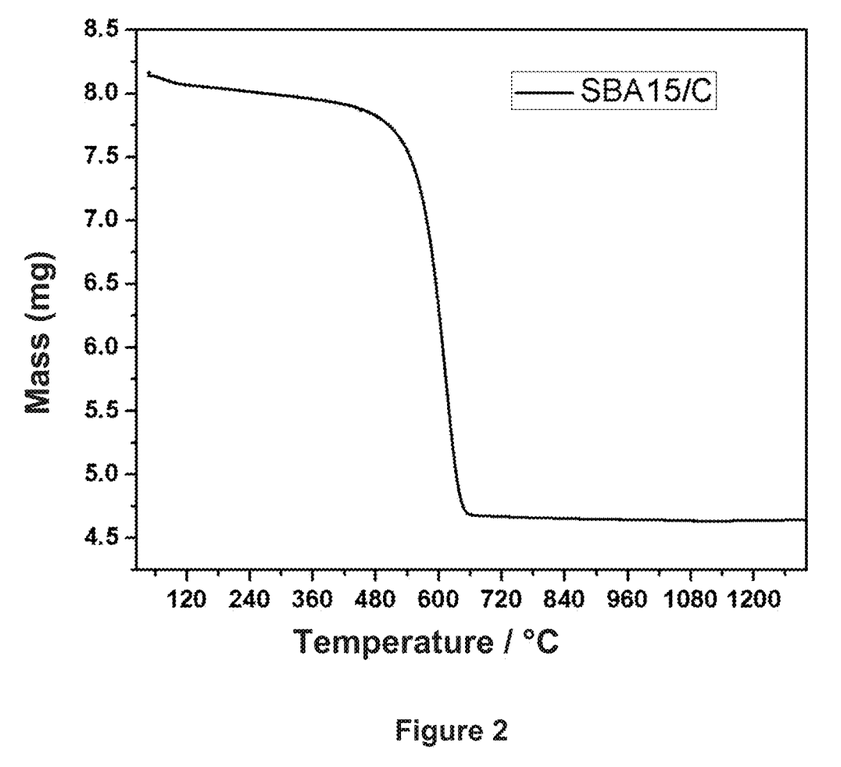
FIG. 2 shows the results of thermogravimetric analysis in air of a composite material according to an exemplary embodiment of the present invention.

FIG. 2 shows the thermogravimetric analysis of SBA-15/C in air. A mass loss of 45% at 600° C. is observed due to decomposition of C to $CO_2$. Therefore, the $SiO_2/C$ ratio in the material was 55/45. Therefore, the C content is significantly higher than that of the composite materials described in the prior art.

Figure 3:
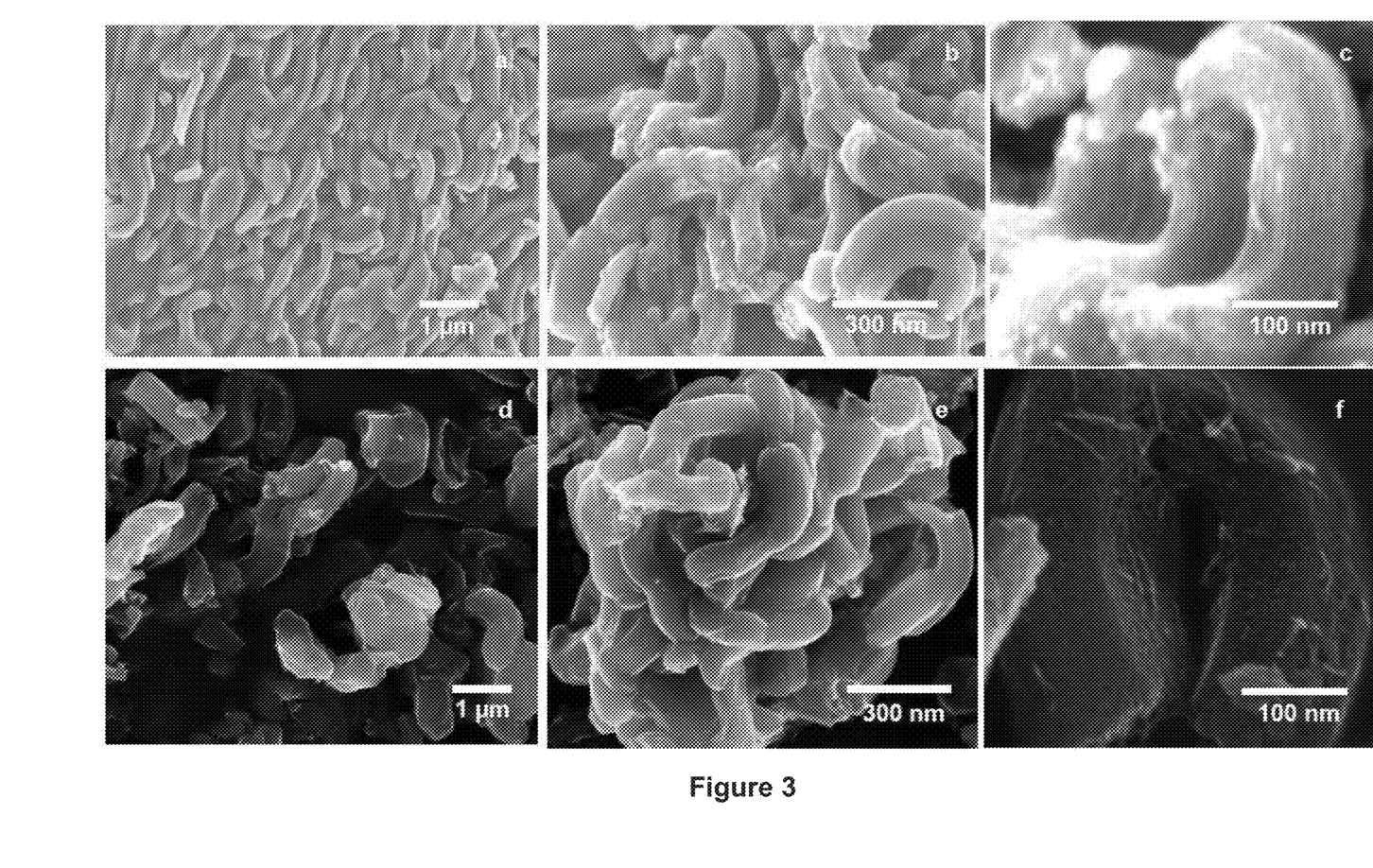
FIGS. 3a-3f show SEM micrographs of the materials obtained in an exemplary embodiment of the present invention.

FIGS. 3a-3f show SEM micrographs of SBA-15/C and CMK-3 in different magnifications. With respect to SBA-15, uniform particles of around 300 nm are observed (FIGS. 3a and 3b) and the interlaminar $SiO_2/C$ structure can also be observed at nanometric scale (FIG. 3c).

On the other hand, SEM micrographs of CMK-3 show a particle size of 200 nm (FIGS. 3d and 3e) and the characteristic nanometric interlaminate that generates the porous structure of the material (FIG. 3f).

2) Electrochemical Performance

To determine the electrochemical performance of SBA-15/C, experiments were performed comparing SBA-15/C with carbonless SBA-15 and CMK-3, which is the carbonaceous structure of the composite material of the present invention. In all cases, for the preparation of the electrodes, the 80:10:10 ratio was maintained between tested material, binder (PVDF) and super-P carbon, respectively.

a) SBA-15/C

As described above, composite material SBA-15/C is a three-dimensional array of $SiO_2$ nanotubes of 8 nm in diameter interconnected by nanotubes of ca. 1 nm in diameter. The nanotubes are filled with carbon treated at 900° C. in inert gas to obtain a conductive material so that the electrons can diffuse through the material to contact $SiO_2$ and reduce it to generate Si in-operation. In addition, it should be mentioned that the metallic Si is semiconductor, so that the carbon coating allows maximizing the conductivity in charging/discharging processes.

Figure 4A:
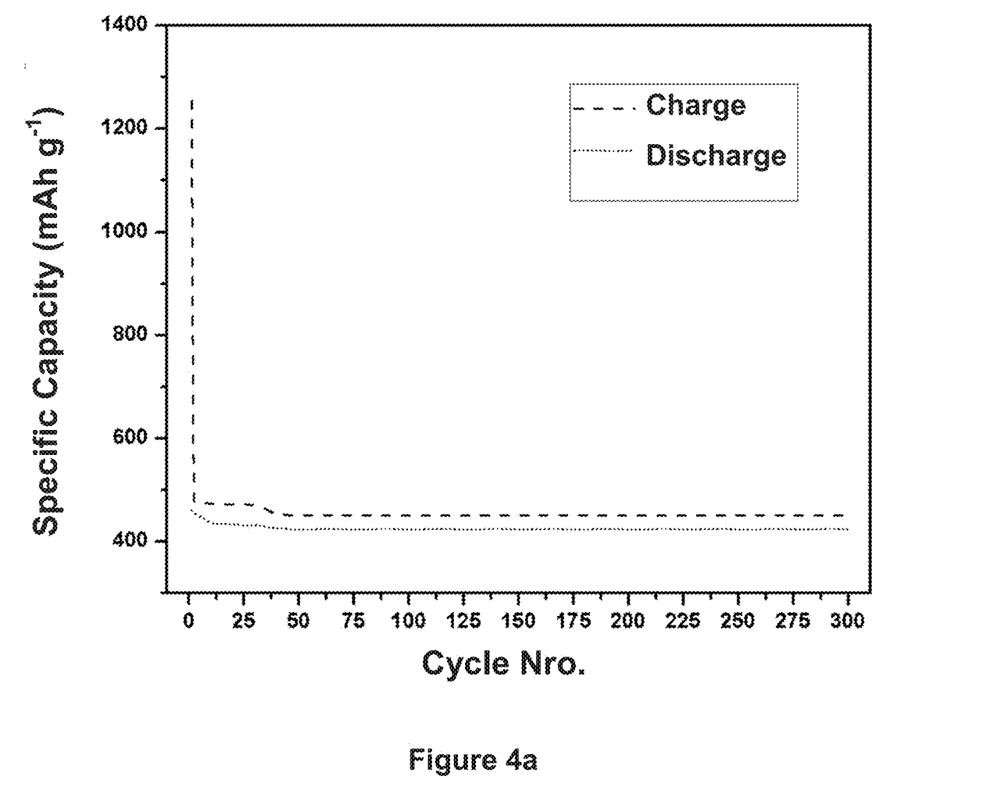
FIGS. 4a-4c show experimental results of electrochemical measurements performed on the composite material obtained in an exemplary embodiment of the present invention.

FIG. 4a shows the specific capacity obtained from galvanostatic charge/discharge profiles of SBA-15/C as a function of the number of charge/discharge cycles performed. An irreversible initial charge capacity of 1300 $mAhg^{-1}$ can be observed. From cycle number 2 and up to cycle number 300, a 450 $mAhg^{-1}$ stable charge/discharge capacity is observed, with an average coulombic efficiency of 93%, calculated between cycles 3 and 300.

Figure 4B:
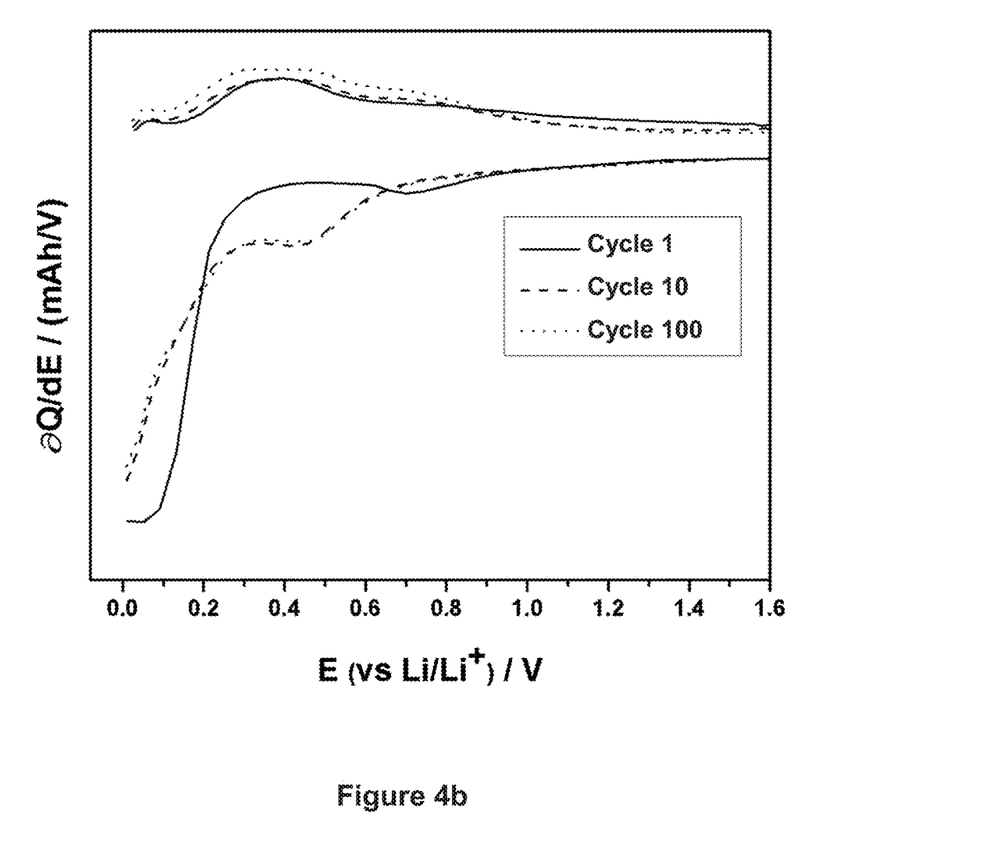

FIG. 4b shows the derivative of charge with respect to potential as a function of the potential. From this derivative, the processes that occur during charging/discharging can be observed. In charge cycle number 1, a cathodic peak around 0.75 V is observed, corresponding to the formation of the solid/electrolyte interface (SEI) and also a wide peak near 0.1 V that can be attributed to the reduction from $SiO_2$ to metallic Si and lithium silicate and lithium oxide, as indicated in partial reactions (1) to (4) above. In the anodic current of cycle number 1, the peaks of a reversible process associated with delitiation can be observed. From cycle number 2, a potential peak of 0.45 V is observed in the cathodic current, corresponding to the reversible reduction of $SiO_2$ and shoulders at lower potentials, probably due to the formation of Li—Si alloys, and peaks at 0.29, 0.48 and 0.8 V in the anodic current associated with delitiation processes.

Figure 4C:
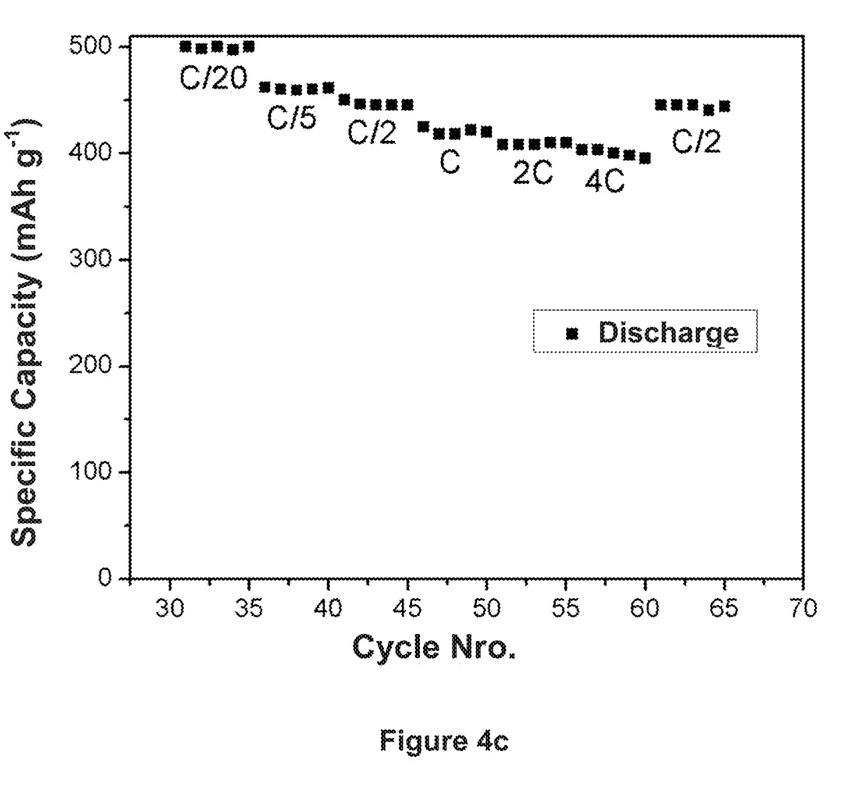

In FIG. 4c one of the most important characteristics of the composite material of the present invention is shown: the discharge capacity at different discharge rates ("rate capability").

In the first 5 cycles, the charging current was adjusted for the electrode to charge in 20 hours (C/20) and the discharge current was adjusted so that the electrode was discharged in 20 hours (C/20). There, the specific discharge capacity was 498 mAhg$^{-1}$. It should be noted that the composite material has a mass ratio SiO$_2$/C of 55/45. Considering SiO$_2$ as an active species and excluding from consideration the carbonaceous material, it can be concluded that the theoretical capacity of the material containing Si should be 905.5 mAhg$^{-1}$. If, on the other hand, a capacity of 250 mAhg$^{-1}$ is attributed to the carbonaceous material (see results for CMK3 below), a theoretical capacity of 701 mAhg$^{-1}$ is obtained for the material comprising silica.

In the following points, the current was adjusted for a charge in 2 hours (C/2) and discharges at different rates. It can be observed that the capacity is little altered; it was even possible to discharge the electrode in 15 min maintaining a capacity of 400 mAhg$^{-1}$. This represents an important tool for application to high power batteries, such as those used in vehicles.

The last set of points shows that the electrode was not altered after the previous experiments, since the discharge capacity at C/2 is maintained.

To determine whether the electrochemical properties found correspond to a synergistic effect between the parts that make up the material, comparative experiments were carried out with SBA-15 without carbonizing and with the carbonaceous structure that is generated within the pores of SBA-15/C, i.e. the CMK-3 material. These comparative experiments will be detailed below.

b) SBA-15

Figure 5A:
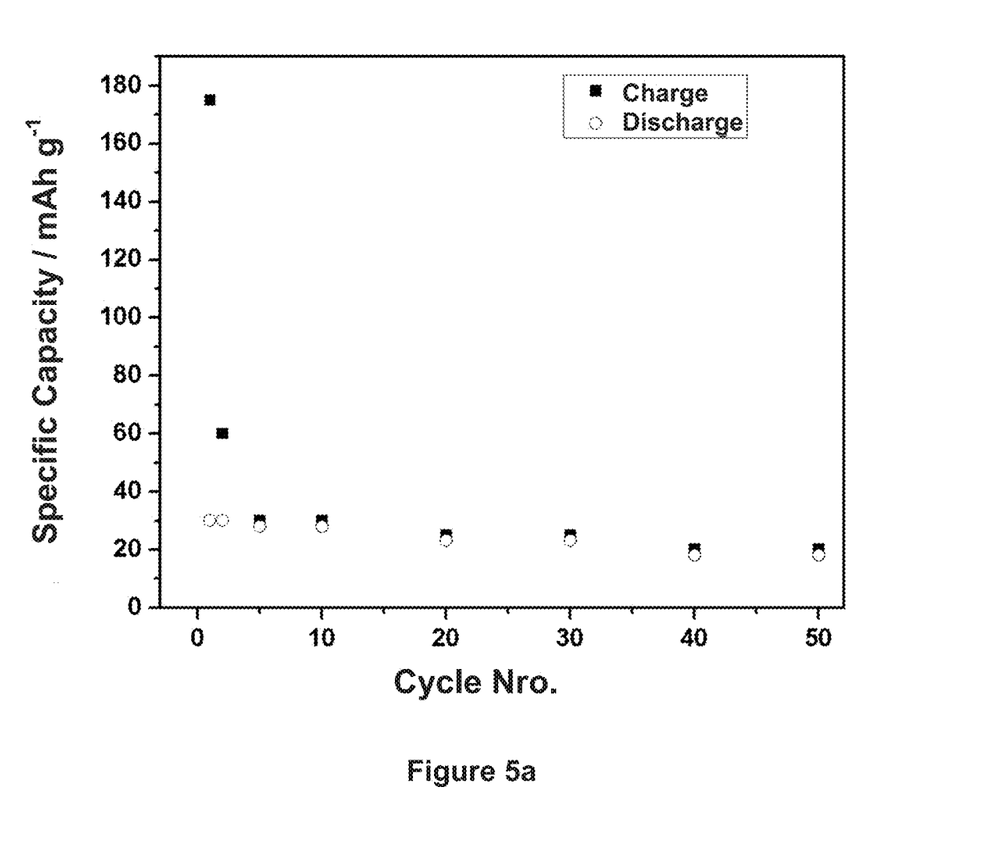
FIGS. 5a-5b show the experimental results of electrochemical measurements performed on the composite material obtained in a first comparative experiment.

The specific capacity obtained from galvanostatic charging/discharging profiles of SBA-15 without carbon is shown in FIG. 5a. There, an initial irreversible charge capacity of 175 mAhg$^{-1}$ can be observed in the first cycle. In the first discharge cycle the capacity was 30 mAhg$^{-1}$ and then the capacity remained around 25 mAhg$^{-1}$. This confirms the low energy storage capacity of SBA-15 in the absence of the carbonaceous material from the carbonization of sucrose.

Figure 5B:
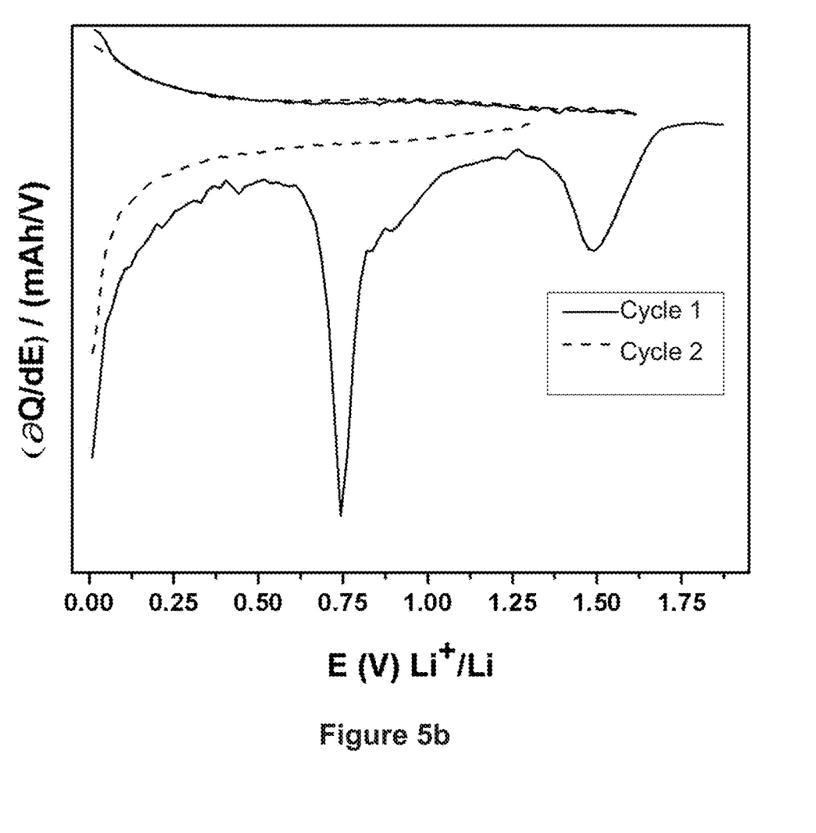

On the other hand, FIG. 5b shows the derivative of charge with respect to potential for the same material. Peaks associated with irreversible processes are observed in the first charge cycle, probably due to the formation of SEI and other irreversible reductions, and then a pseudo-capacitive behavior is observed.

b) CMK-3

The carbonaceous matrix of the composite material SBA-15/C is called CMK-3. As described above, this material has a porous structure of mesoporous nanotubes 5 nm in diameter, joined by microporous nanotubes of 1 nm in diameter.

Figure 6A:
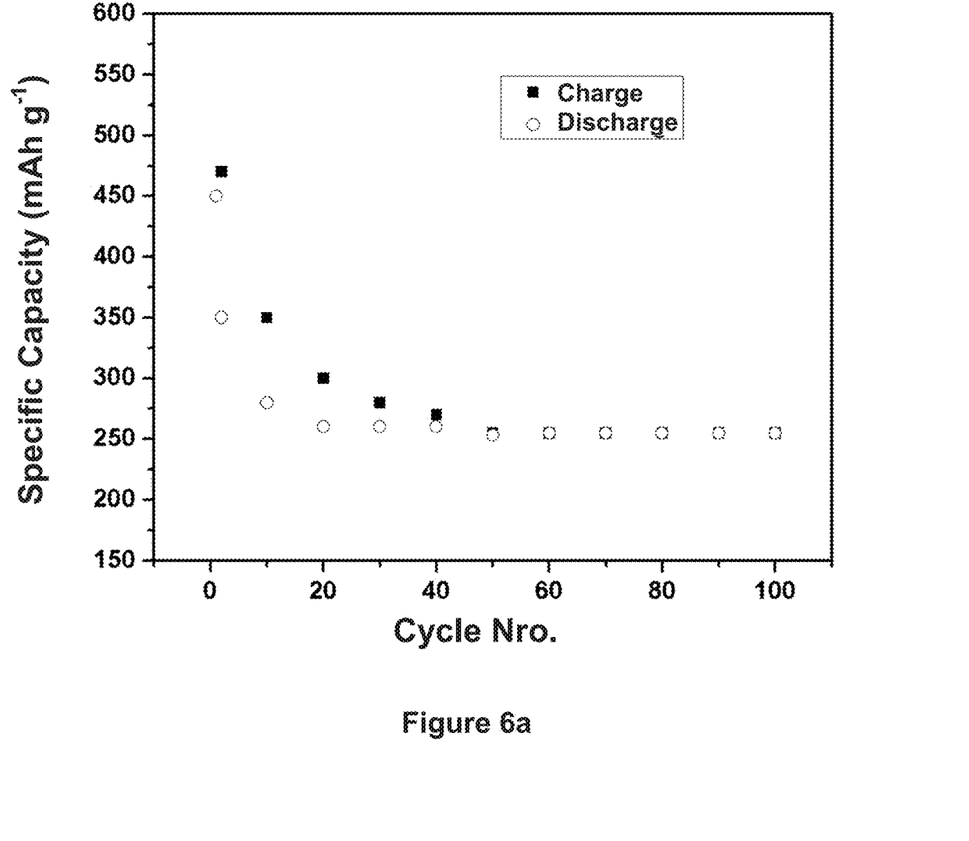
FIGS. 6a-6b show the experimental results of electrochemical measurements performed on the composite material obtained in a second comparative experiment.

FIG. 6a shows the specific capacity obtained from the galvanostatic charge/discharge profiles of CMK-3. An initial charge capacity of 3000 mAhg$^{-1}$ (not shown in the graph due to scale issues) and an initial discharge capacity of 446 mAhg$^{-1}$ showing an irreversible capacity of 2554 mAhg-1 were found. The charging and discharging values are stabilized after cycle number 50 and remain constant up to cycle number 100 in values of 250 mAhg$^1$.

Figure 6B:
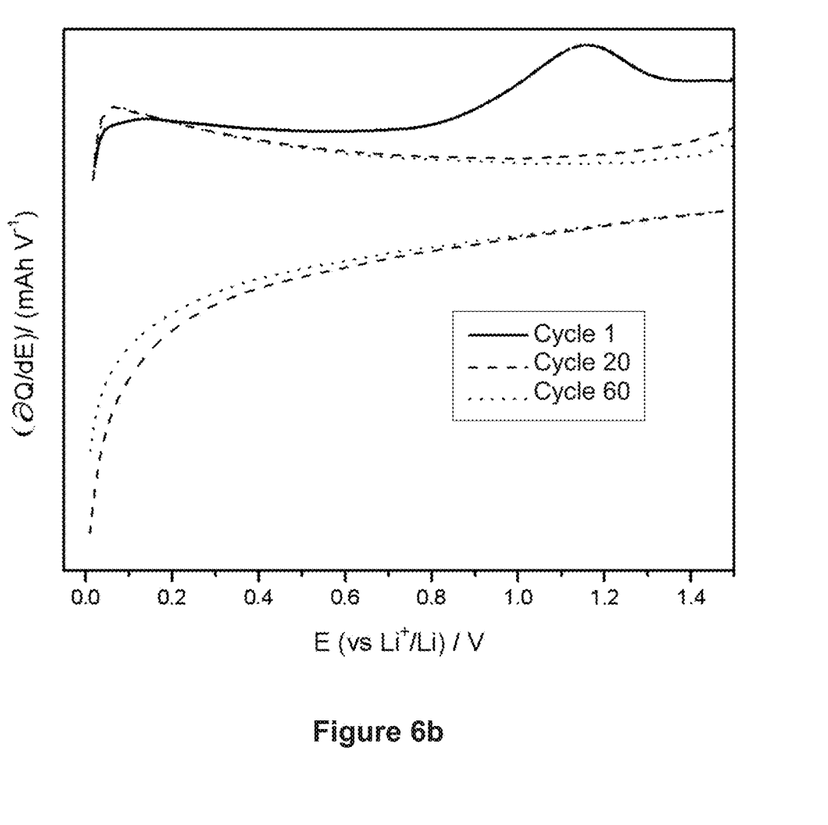

FIG. 6b shows the derivative of charge with respect to potential for the CMK3 material. Peaks of cathodic current at 0.68 and 0.9 V are found in cycle number one. These correspond to irreversible processes associated with the formation of the solid/electrolyte interface in the mesopores and in the micropores.

It should be noted that this material has an apparent specific surface area of 1050 m$^2$/g, so the filling of pores with electrolyte results in a significant current consumption due to electrolyte decomposition and reduction of superficial functional groups which is evidenced in the high Initial specific capacity.

Subsequent cycles in the dQ/dE plot in FIG. 6b do not show any specific lithium ion storage process, but rather an apparent pseudo-capacitive behavior of the material with good ion storage capacity, probably due to the charging of the double layer.

The results obtained in the previous examples show a synergistic effect during use of composite material SBA-15/C as an anode. The conductive material obtained allows the in-operation reduction of SiO$_2$ to Si. Without wishing to be bound to theory, it can be considered that the underlying carbon structure functions as a connecting tree, which allows the access of electrons to most of the SiO$_2$ matrix, allowing its massive reduction. The existence of reversible processes at low potentials suggests that Si would store Li ions through the formation of Li—Si alloys, showing a high capacity and power and great recyclability, which would have important economic incidences in the manufacture of batteries.

As mentioned above, in the prior art, Si-anodes have been proposed that must be obtained by previous reduction of SiO$_2$. This reduction process is an activated process that requires high temperatures and/or drastic reducing agents, and so it is expensive.

The method of the present invention is an economically favorable alternative, since it does not involve any of the mentioned extreme conditions.

Those skilled in the art will recognize or may determine, using only routine experimentation, many equivalents of the specific procedures, embodiments, claims and examples described herein. Said equivalents are considered to be within the scope of the present invention and covered by the appended claims.

The invention claimed is:

1. An anode for a lithium-ion battery, comprising a composite material comprising carbon nanofibers and SiO$_2$, said composite material having a porous structure comprising mesopores interconnected by micropores, wherein said carbon nanofibers occupy a pore space of said porous structure and the content of carbon nanofibers in said composite material is about 45% by weight.

2. The anode according to claim 1, wherein said mesopores have a mean diameter of about 5 nm and said micropores have a mean diameter of about 1 nm.

3. A lithium-ion battery, comprising the anode according to claim 1.

4. The lithium-ion battery according to claim 3, wherein a chemical reduction reaction of SiO$_2$ to Si occurs at said anode.

5. The lithium-ion battery according to claim 4, wherein Li—Si alloys are formed in the anode.

6. The anode according to claim 1, wherein the anode is produced by a method comprising the steps of:
   a) providing a porous material from a SiO$_2$ source,
   b) impregnating said porous material with a solution comprising a carbon source and an acid, and
   c) drying the porous material obtained in b).

7. The anode according to claim 6, wherein the carbon source is sucrose and the acid is sulfuric acid.

8. The anode according to claim 6, wherein the step of drying the porous material is carried out at 900° C. under an argon atmosphere.

* * * * *